No. 690,718. Patented Jan. 7, 1902.
V. M. GABRIELLE.
BICYCLE SUPPORT.
(Application filed July 15, 1901.)

(No Model.)

WITNESSES:
Fred D. Bradford
Perry B. Turpin

INVENTOR
Victor M. Gabrielle.
BY Munn & Co.
ATTORNEYS

UNITED STATES PATENT OFFICE.

VICTOR MARIUS GABRIELLE, OF NATIONAL SOLDIERS HOME, VIRGINIA.

BICYCLE-SUPPORT.

SPECIFICATION forming part of Letters Patent No. 690,718, dated January 7, 1902.

Application filed July 15, 1901. Serial No. 68,315. (No model.)

*To all whom it may concern:*

Be it known that I, VICTOR MARIUS GABRIELLE, a citizen of the United States, residing at National Soldiers Home, in the county of Elizabeth and State of Virginia, have made certain new and useful Improvements in Bicycle-Supports, of which the following is a specification.

This invention is an improvement in bicycle-supports, and has for an object, among others, to provide an improved fastening by which to prevent the front wheel from turning when the bicycle is supported when not in use; and the invention consists in certain novel constructions and combinations of parts, as will be hereinafter described and claimed.

Figure 1:
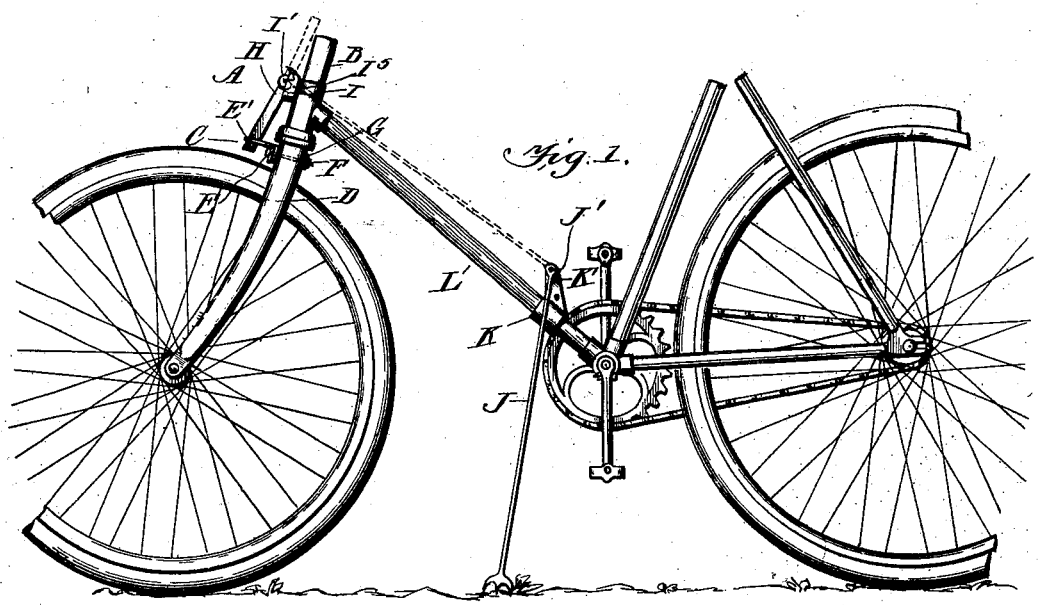
Figures 2, 3, 4:
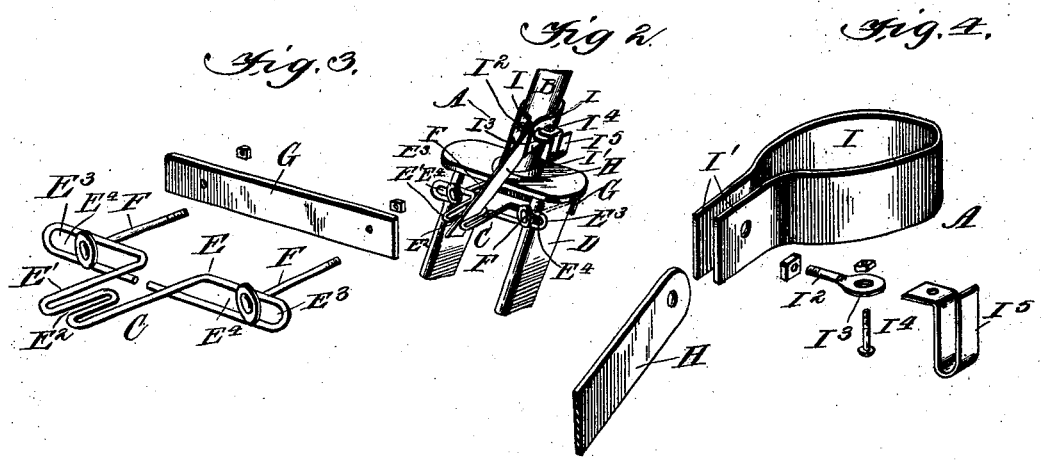
Figure 5:
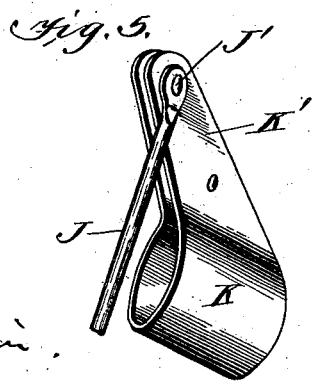

In the drawings, Figure 1 is a side view of a bicycle, partly broken away, provided with my improvements. Fig. 2 is a detail perspective view of the fork-fastening devices applied to a bicycle, a portion only of the latter being shown. Fig. 3 is a detail perspective view of that portion of the fastener designed to be applied to the fork of the front wheel. Fig. 4 is a detail perspective view of that portion of the fastening designed to be applied to the head of the bicycle; and Fig. 5 illustrates in detail the construction of the bicycle-support, as will be more fully described hereinafter.

The fastening for preventing the front wheel from turning is shown as consisting of a portion A, designed to be connected with the head B of a bicycle, and a section C, designed for connection with the fork D. For convenience of reference I will refer to the sction A as the "head-section" and to the section C as the "fork-section" of the fastening. The section C is composed of the main member or front portion E, which is constructed with the forwardly-projecting part E', having at its middle the slot $E^2$, which forms a seat for the latch-plate, presently described. The section E is also provided with laterally-extending portions $E^3$, which are provided with slots $E^4$, elongated laterally and receiving the clamping-bolts F, by which the member E is connected with the back plate G in the application of the section C to the fork of the bicycle.

By preference the member E is formed from a wire or rod of suitable metal bent upon itself at its middle to provide the seat $E^2$ and then bent between its middle and its ends to provide the other portions, as before described. When applied to the bicycle-fork D, the member E is arranged at the front side of the fork, overlapping the opposite arms thereof, as shown, and the back plate G is correspondingly arranged against the rear side of the fork, and the bolts F connect the parts E and G and serve to bind them firmly upon the fork. It will be noticed the fork-section C is arranged a short distance above the periphery of the wheel and clear of said wheel, as best shown in Fig. 1. It will be noticed that the section C can be readily applied to and removed from the bicycle and permits of a certain range of adjustment to permit its application to forks of different widths.

The latch H for engagement in the seat $E^2$ is preferably a plate, as shown, which is pivoted at its upper end between the ends I' of a clasp I, whose ends I' are connected by the bolt $I^2$, which also forms a pivot for the latch-plate H, so the latter can be conveniently thrown down into the slot $E^2$ or up out of the way, as may be desired. The bolt $I^2$ has at one end a flattened head $I^3$, on which is pivoted by a bolt $I^4$ the bracket $I^5$, which forms a seat for one end of the supporting-rod J, the opposite end of which is pivoted at J' to the arms K' of the clasp K, which is secured upon the frame-bar L of the bicycle.

In the operation of the fork-fastening means before described it will be noticed that when the latch H is lowered to the full-line position shown in Fig. 1 it will lie within the slot $E^2$ of the fork-section and operate to prevent the fork from turning in the post of the bicycle, to which the latch is secured by the clasp I. The support J may be readily adjusted from the dotted-line position, Fig. 1, where it is supported by the bracket $I^5$, to the full-line position shown in said figure, where it will support the bicycle in an upright position, as desired. From the foregoing it is evident that the support J will hold the bicycle from tilting to one side and will coöperate with the fastening means A and C, which prevent the front wheel from turning to preserve the bicycle in the position to which it may be adjusted.

The construction is simple and inexpensive, can be readily applied to any ordinary form of bicycle, and will efficiently serve the purpose for which it is intended.

While the construction of the member E as shown is preferred, it is manifest such member might be formed from a metal plate having a suitable vertical flange for engagement by the securing-bolts and a forwardly-projecting flange slotted to receive the latch H, also that the member G may be made of wire, if desired, without departing from the principles of the invention.

Having thus described my invention, what I claim as new, and desire to secure by Letters Patent, is—

1. In a bicycle-support, a fork-section composed of a rear member having openings for the bolts, a front member having laterally-elongated slots for the passage of the fastening-bolts and arranged to lap in front of the fork, and provided with a seat for the latch-plate, the bolts connecting said front and rear members, and the latch-plate, substantially as set forth.

2. In a bicycle-support, a fork-section composed of a front member having a central forwardly-opening slot forming a seat for the latch-plate and laterally-projecting portions to overlap the arms of the fork and provided with openings for the clamping-bolts, back plate to overlap the arms of the fork on the side opposite the front member and the clamping-bolts connecting said member and back plate, the latter being adapted for application to the fork of a bicycle and the latch-plate, substantially as set forth.

3. A fork-section composed of a front member bent from a length of suitable material to provide the forwardly-projecting portion returned providing the forwardly-opening slot, and the lateral portions providing the laterally-elongated slots and arranged to overlap the front of the fork-bars, the back plate overlapping the rear of the fork-bars and the clamping-bolts connecting the front member and back plate and the latch-plate, substantially as set forth.

4. The combination of the bicycle, the supporting-bar therefor, a clasp embracing the frame-bar of the bicycle and to which the supporting-bar is pivoted at one end, and the wheel-fastening devices comprising a clasp embracing the post of the bicycle, a bolt connecting the ends of said clasp and the bracket carried by said bolt and arranged to form a support for the swinging end of the bicycle-support, substantially as set forth.

VICTOR MARIUS GABRIELLE.

Witnesses:
JAMES WILSON,
SAMPSON J. HARBISON.